(12) United States Patent
German et al.

(10) Patent No.: US 7,364,035 B2
(45) Date of Patent: Apr. 29, 2008

(54) AIRLESS ACCUMULATION CONVEYOR (75) Inventors: Harry T German, Belding, MI (US); David H Cotter, Coopersville, MI (US); Wynn M Pelak, Rockford, MI (US); Dennis J Schuitema, Ada, MI (US)

(73) Assignee: Dematic Corp., Grand Rapids, MI (US)

( * ) Notice: Subject to any disclaimer, the term of this patent is extended or adjusted under 35 U.S.C. 154(b) by 155 days.

(21) Appl. No.: 11/420,248

(22) Filed: May 25, 2006

(65) Prior Publication Data

US 2006/0266625 A1 Nov. 30, 2006

Related U.S. Application Data

(60) Provisional application No. 60/766,346, filed on Jan. 12, 2006, provisional application No. 60/597,503, filed on Dec. 6, 2005, provisional application No. 60/714,931, filed on Sep. 7, 2005, provisional application No. 60/684,378, filed on May 25, 2005.

(51) Int. Cl.
*B65G 13/06* (2006.01)
(52) U.S. Cl. .................. 198/781.03; 198/790
(58) Field of Classification Search .......... 198/781.01, 198/781.03, 781.05, 781.09, 781.1, 790
See application file for complete search history.

(56) References Cited

U.S. PATENT DOCUMENTS

| | | | |
|---|---|---|---|
| 3,327,837 A | 6/1967 | Covell | |
| 3,610,406 A | 10/1971 | Fleischauer | |
| 4,006,815 A | 2/1977 | Werntz | |
| 4,006,816 A | 2/1977 | Werntz | |
| 4,103,769 A | 8/1978 | Jorgensen | |
| 4,345,684 A | 8/1982 | Rolland | |
| 4,469,220 A * | 9/1984 | Becker | 198/781.02 |
| 4,844,231 A * | 7/1989 | Usui | 198/784 |
| 4,921,091 A * | 5/1990 | Kehlenbach | 198/782 |
| 4,951,808 A | 8/1990 | Collins et al. | |
| 5,060,785 A | 10/1991 | Garrity | |
| 5,168,979 A | 12/1992 | Iversen | |
| 5,823,319 A | 10/1998 | Resnick et al. | |
| 5,862,907 A | 1/1999 | Taylor | |
| 6,065,588 A | 5/2000 | Cotter et al. | |

(Continued)

FOREIGN PATENT DOCUMENTS

EP  0 446 992 B1  6/1994

(Continued)

*Primary Examiner*—James R. Bidwell
(74) *Attorney, Agent, or Firm*—Van Dyke, Gardner, Linn & Burkhart, LLP (57) ABSTRACT

An accumulation conveyor and method, according to the invention, includes providing a plurality of tandem accumulation zones, each of the zones including a conveying surface and at least one drive roller selectively driving the conveying surface. A drive member below the conveying surface extends a length of the plurality of tandem accumulation zones. Each of the zones includes a clutch roller rotated by the drive member and an electromagnetic clutch. The clutch selectively transfers rotation of the clutch roller to the drive roller to drive the conveying surface. The clutch may be made up of a pair of concentric cylinders aligned in a vertical plane and a force transmission member between the concentric cylinders with the force transmission member transmitting force between the concentric cylinders when the clutch is electrically actuated. The clutch may be a wrapped-spring clutch.

36 Claims, 11 Drawing Sheets

U.S. PATENT DOCUMENTS

| | | |
|---|---|---|
| 6,193,054 B1 | 2/2001 | Henson et al. |
| 6,315,104 B1 | 11/2001 | Ebert |
| 6,471,043 B2 | 10/2002 | Schwingshandl et al. |
| 6,478,142 B2 | 11/2002 | Cotter et al. |
| 6,516,940 B1 * | 2/2003 | Hart et al. ............... 198/781.1 |
| 6,615,975 B2 | 9/2003 | Ranger et al. |
| 6,772,874 B2 | 8/2004 | Yamashita et al. |
| 6,805,234 B2 | 10/2004 | Warnecke |
| 6,814,222 B2 | 11/2004 | Henson et al. |
| 6,827,202 B2 | 12/2004 | Topmiller et al. |
| 6,860,381 B2 | 3/2005 | Newsom et al. |
| 6,868,961 B2 | 3/2005 | Ehlert et al. |
| 6,899,219 B2 | 5/2005 | Cotter et al. |
| 7,021,456 B2 * | 4/2006 | Haan et al. ............ 198/781.01 |
| 2002/0092736 A1 | 7/2002 | Masuda |

FOREIGN PATENT DOCUMENTS

| | | |
|---|---|---|
| EP | 0 586 624 B1 | 9/1996 |
| EP | 1 132 321 B1 | 9/2003 |
| EP | 1 517 848 B1 | 11/2005 |
| JP | 55048111 | 4/1980 |
| JP | 4365708 | 12/1992 |
| JP | 5178430 | 7/1993 |
| JP | 07149412 A | 6/1995 |

* cited by examiner

AIRLESS ACCUMULATION CONVEYOR

CROSS REFERENCE TO RELATED APPLICATIONS

This application claims priority from U.S. provisional patent application Ser. No. 60/684,378, filed on May 25, 2005; U.S. provisional patent application Ser. No. 60/714,931, filed on Sep. 7, 2005; U.S. provisional patent application Ser. No. 60/597,503, filed on Dec. 6, 2005; and U.S. provisional patent application 60/766,346, filed on Jan. 12, 2006, the disclosures of which are hereby incorporated herein by reference in their entirety.

BACKGROUND OF THE INVENTION

The present invention is directed to an accumulation conveyor system and, in particular, to such a system utilizing a conveying surface driven by rollers and an elongated drive member which selectively rotates the rollers. The drive member is illustrated as an endless drive belt. However, other drive members, such as shafts, may be used.

It is known to provide accumulation conveyors utilizing pneumatic actuation. While pneumatic actuation is very effective, it requires additional expense for installation of a pneumatic supply system as well as the cost of maintaining and operating a compressor. Also, plastic tubing used in the system may leak resulting in less than optimal operation of the system.

SUMMARY OF THE INVENTION

The present invention is directed to an accumulation conveyor that does not utilize pneumatic activation. In particular, the present invention is directed to an all-electric accumulation conveyor. Because it is all-electric, there is no necessity to operate a compressor system needed to supply pneumatic energy which must be operated irrespective of the load on the conveyor system. Also, the present invention is expected to have reduced maintenance over pneumatic systems.

An accumulation conveyor, according to an aspect of the invention, includes a plurality of tandem accumulation zones. Each of the zones includes a conveying surface and at least one drive roller that is selectively driving the conveying surface. A drive member below the conveying surface extends a length of a plurality of the tandem accumulation zones. Each zone includes a clutch roller rotated by the drive member and electromagnetic clutch. The clutch selectively transfers rotation of the clutch roller to the drive roller in order to drive the conveying surface. The clutch is made up of a pair of concentric cylinders that are aligned in a vertical plane. The clutch further includes a force transmission member between the concentric cylinders. One of the concentric cylinders rotates with the clutch roller and the other of the concentric cylinders rotates with the drive roller. The force transmission member transmits force between the concentric cylinders when the clutch is electrically actuated.

The concentric cylinders may be freely rotational with respect to each other in at least one direction when the clutch is not electrically actuated. The clutch may be adapted to be actuated by a low-voltage signal, such as that produced by an electronic control. The force transmission member may be a tensioning member, such as a wrapped spring.

An electromagnetic actuator may be provided in the vertical plane and causing the force transmission member to transmit force between the concentric cylinders when the electromagnetic actuator is actuated. The electromagnetic actuator may be generally stationary. This advantageously facilitates the wiring to the electromagnetic actuator without the necessity of slip-rings, and the like. This reduces the cost of any potential maintenance difficulties with the accumulation conveyor.

A shaft may be provided with the drive roller rotational with the shaft. The shaft is rotational with the other of the concentric cylinders. The shaft may be mechanically joined with the drive roller such that the clutch roller and the drive roller are generally collinear with each other.

The conveying surface may be made up of a conveyor belt. This facilitates the accumulation of a wide range of articles, such as articles having a non-flat or flexible lower surface, or the like. Also, small objects may be accumulated. At least one ridge may be provided on the drive roller in order to track the conveyor belt. The at least one ridge may be made up of a plurality of ridges. This provides a further ability to track the conveyor belt. In each of the zones, a conveyor belt may be supported by the drive roller and another roller. Either the drive roller or the other roller may be an upstream roller for a particular zone and the other of the drive rollers and another roller may be the downstream roller for that zone. The downstream roller of one of the zones may have a larger diameter than the upstream roller of an adjacent downstream zone. This provides a slight drop in the package as it transfers from one zone to the next thereby reducing the likelihood of an article being jammed especially if the article has a flexible lower surface, or the like. Also, this provides the ability to retrofit existing pneumatic accumulation conveyors in the field and converting the existing pneumatic conveyors to an airless accumulation conveyor according to the invention, An accumulation conveyor, according to another aspect of the invention, includes a plurality of tandem accumulation zones, each of the zones including a conveying surface and at least one drive roller selectively driving the conveying surface. A drive member is provided below the conveying surface. The drive member extends the length of a plurality of the tandem accumulation zones. Each of the zones includes a clutch roller rotated by the drive member and the electromagnetic clutch. The clutch selectively transfers rotation of the clutch roller to the drive roller to drive the conveying surface when the clutch is actuated. According to this aspect of the invention, the clutch is made up of a wrapped-spring clutch.

An accumulation conveyor, according to yet another aspect of the invention, includes a plurality of tandem accumulation zones, each of the zones including a conveying surface and at least one drive roller selectively driving the conveying surface. A drive member below the conveying surface extends a length of the plurality of tandem accumulation zones. A clutch roller is rotated by the drive member. An electromagnetic clutch selectively transfers rotation of the clutch roller to the drive roller to drive the conveying surface. According to this aspect of the invention, the clutch roller and the drive roller are not collinear.

The drive roller may be freely rotational in at least one direction when the clutch is not electrically actuated. The clutch is adapted to be actuated by a low voltage signal, such as one produced by an electronic logic circuit. The clutch may be a wrapped-spring clutch.

A drive member may be provided between the clutch and the drive roller. The drive member may be a cogged-belt. The conveying surface may be a conveyor belt with at least one ridge on the drive roller. The at least one ridge tracks the conveyor belt. The at least one ridge may be a plurality of ridges.

The conveying surface may be made up of a plurality of rollers. The rollers may be interconnected with the drive roller through a series of O-rings. Alternatively, the drive roller may propel a secondary belt below the rollers defining a zone of the conveying surface. The secondary belt rotates the rollers of a zone of the conveying surface.

These and other objects, advantages and features of this invention will become apparent upon review of the following specification in conjunction with the drawings.

DESCRIPTION OF THE PREFERRED EMBODIMENT

Referring now specifically to the drawings, and the illustrative embodiments depicted therein, an airless accumulation conveyor 10 includes a conveying surface 12 for conveying articles (not shown). As is conventional, accumulation conveyor 10 is divided into a plurality of tandem zones 14. Each zone includes an article sensor, such as a photo-eye, for sensing articles in the particular zone. In the illustrated embodiment, the photo-eye uses a source/sensor unit 16a and a reflector 16b, but unitary sensors may be used. Also, proximity sensors, sensing rollers, and the like, may be used. Each zone further includes a conveying belt 118 that is selectively movable to convey articles and stopped to accumulate articles. Accumulation conveyor 10 may be controlled by any of various known accumulation control techniques. It may be controlled using the techniques disclosed in commonly assigned application Ser. No. 60/597,178 filed by Lupton entitled ARTICLE ACCUMULATION METHOD AND APPARATUS, the disclosure of which is hereby incorporated herein by reference, Conveying belt 18 is generally supported by support rollers 20, 21 and 22. In the illustrative embodiment, conveying belt 18 is supplied according to the principles disclosed in commonly assigned U.S. Pat. No. 6,811,018, the disclosure of which is hereby incorporated herein by reference. Utilizing the techniques disclosed in the '018 patent, belt 18 is stretched between a drive roller 22 and a tensioning roller 21 at opposite ends of a zone. Rollers 20 support belt 18 in the interior of the zone. However, other types of conveying belts and other types of conveying surfaces, such as motor driven rollers, may be used. Also, accumulation conveyor 10 may be used to accumulate articles on curved conveyor sections as disclosed in commonly assigned U.S. Pat. No. 6,971,510 entitled CURVED BELT CONVEYOR, the disclosure of which is hereby incorporated herein by reference.

Conveying belt 18 may extend laterally a fraction of the width of conveying surface 12 or may extend substantially the entire width of conveying surface 12. If it extends only a fraction of the conveying surface, then articles would be justified toward the side of the conveyor having the conveying belt, prior to entering the accumulation conveyor using known devices. This would allow small articles to travel generally on the conveying belt while allowing larger articles to travel partially on the conveying belt and partially on the support rollers 20. Support rollers 20 are freely rotatable rollers. Drive roller 20 and/or tensioning roller 21 at the opposite end of that zone may have one or more ridges. This acts to track belt 18. Also, at a junction between zones, the upstream roller may have a slightly larger diameter than the adjacent downstream roller. This eases transfer of an article from one zone to another. It also allows rollers to be field retrofitted on existing pneumatic accumulation conveyors by ensuring uniform shaft spacing. Tensioning roller 21 includes a full shaft 45 that supports the cylinder by opposite bearings 47. A spring 46 allows shaft 45 to be positioned in side channels 28. Support rollers may be made from cartridges 38 rotatably supporting a cylinder at opposite ends.

Figure 1:
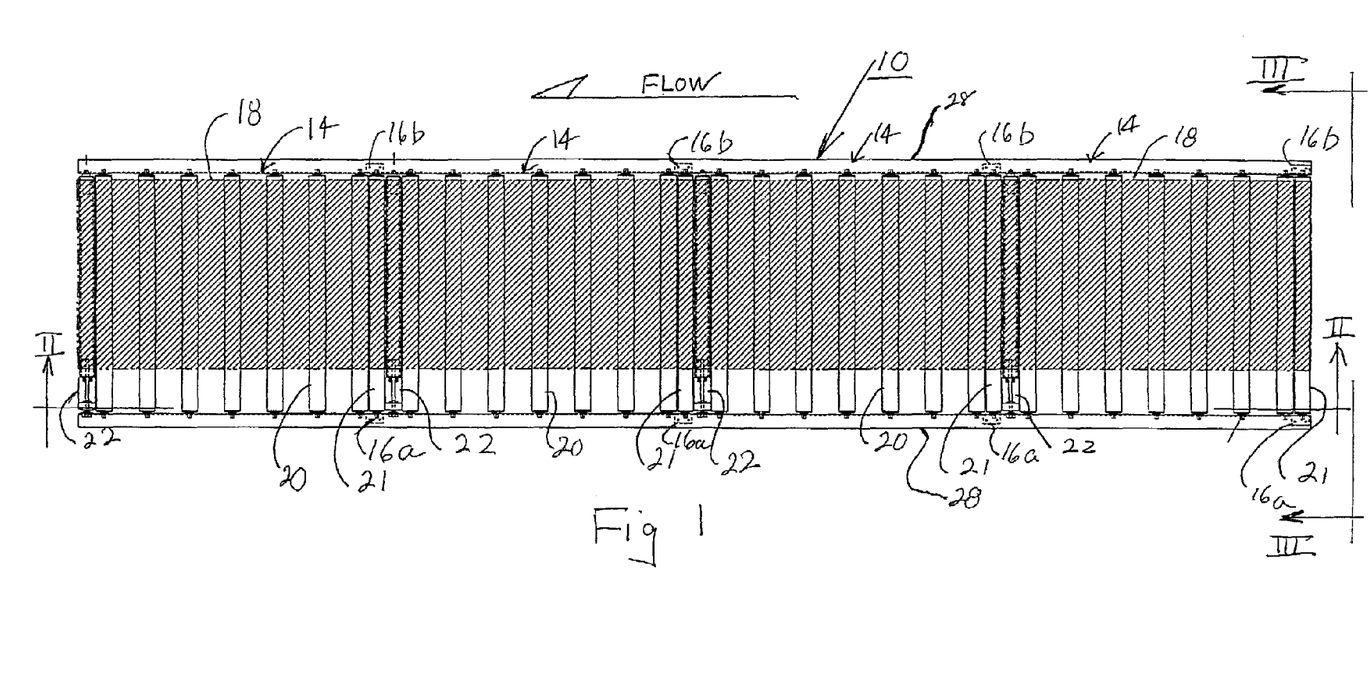
FIG. 1 is a top plan view of an airless accumulation conveyor, according to the invention.
Figure 2:
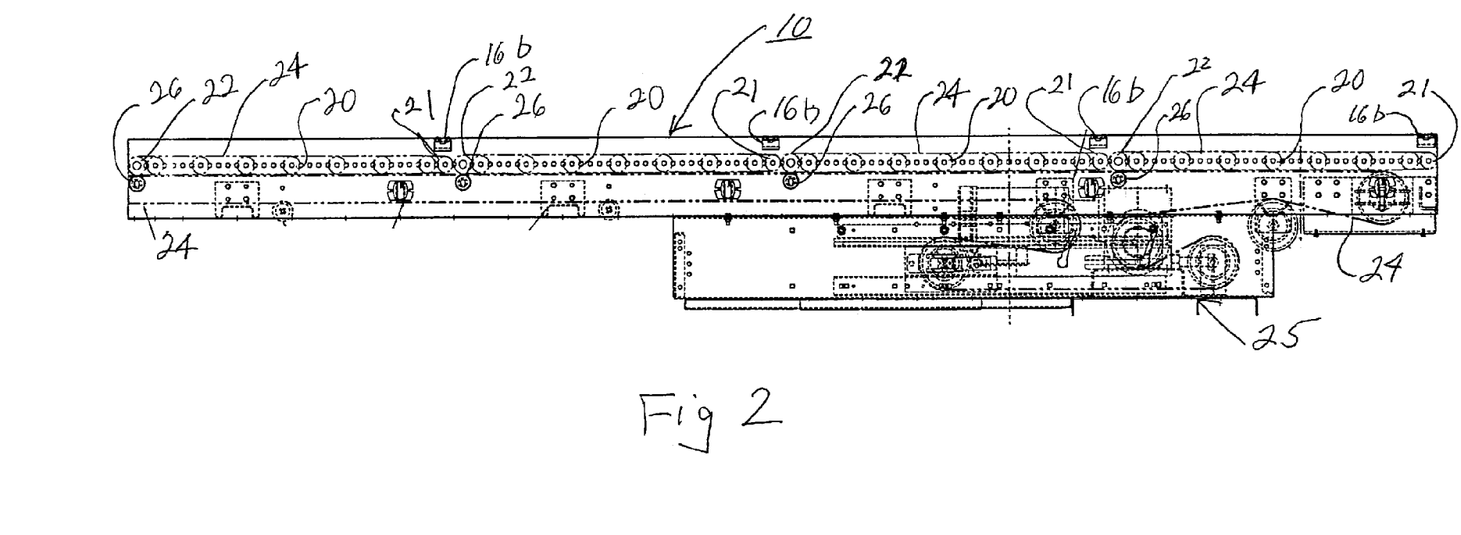
FIG. 2 is a sectional view taken along the lines II-II in FIG. 1.
Figure 3:
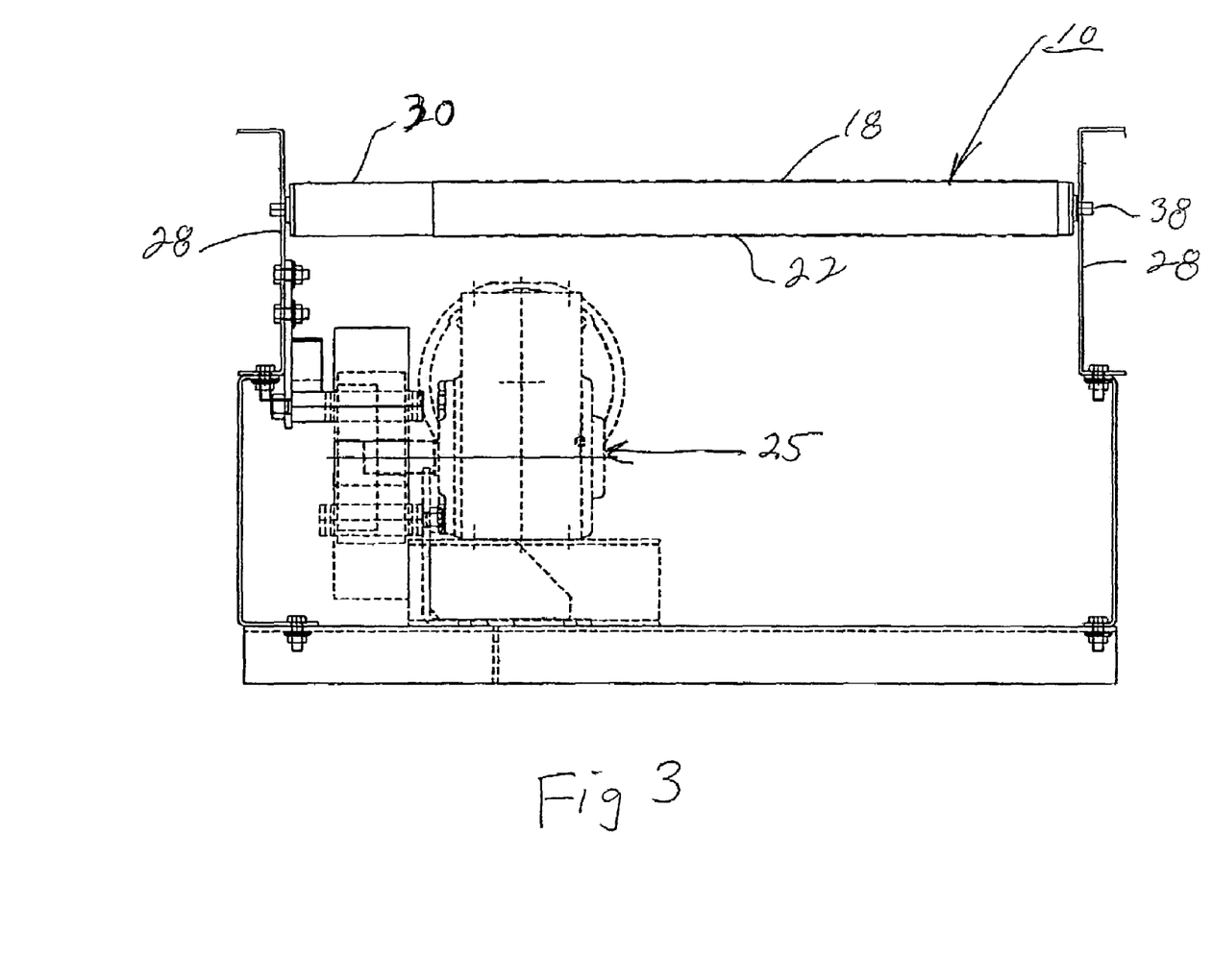
FIG. 3 is an end elevation taken from the direction III-III in FIG. 1.
Figure 4:
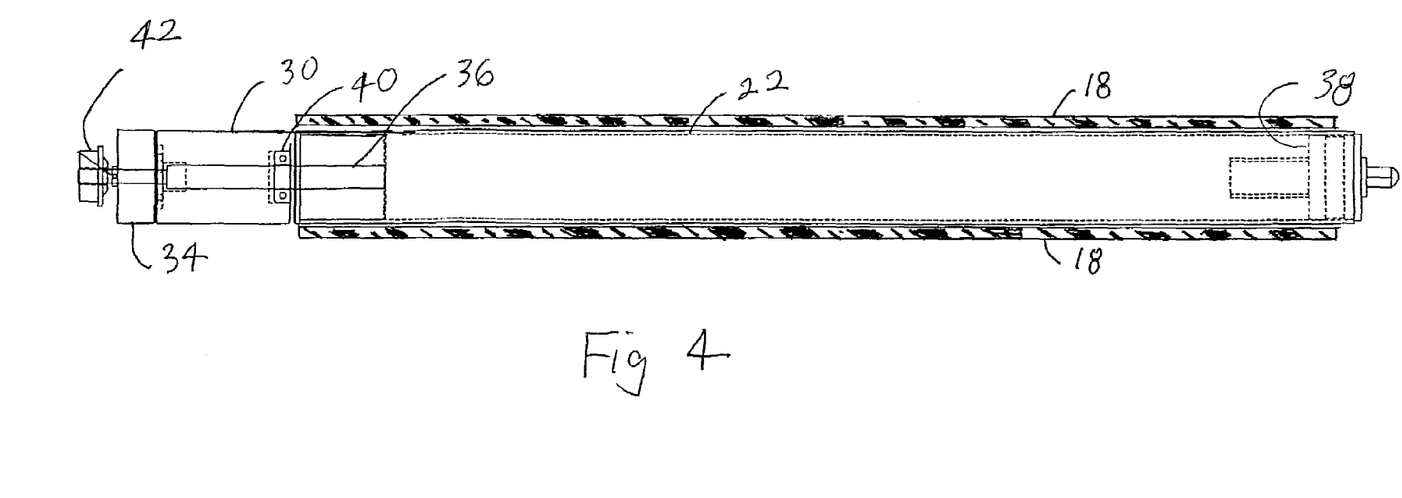
FIG. 4 is an enlarged view of a drive roller.
Figure 5:
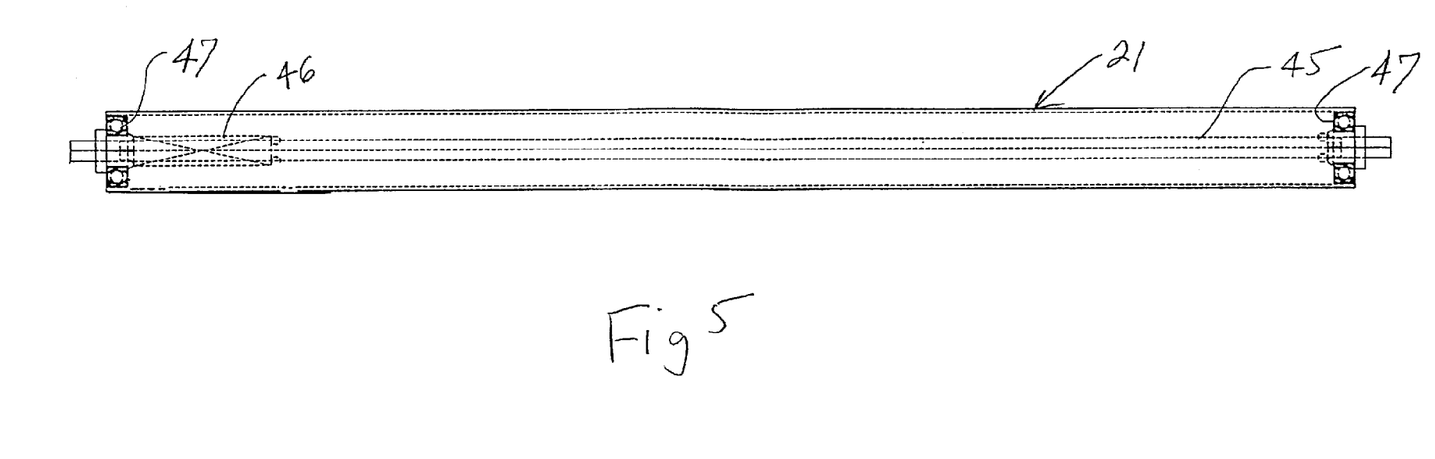
FIG. 5 is an enlarged view of a belt tensioning roller.

Conveying belt 10 is selectively driven by one or more drive rollers 22 in that zone. Drive roller 22 may be the lead roller in the zone, as illustrated in FIG. 1, or the trailing roller in the zone, or both. Drive roller 22 is driven by the motion of a clutch roller 30 which is rotated by a drive member, such as drive belt 24. Drive belt 24 is below conveying surface 12 and extends the length of accumulation conveyor 10. Drive belt 24 is continuously rotated by an electric drive 25. Such electric drive and drive belt are conventional. Drive belt 24 is brought into contact with clutch roller 30 utilizing one or more snubber rollers 26 or other snubbing technique known in the art. Rollers 20, 21 and 22 are supported by opposite side channels 28 which may be either supported off the floor or may be suspended from above, such as by roof trusses, as is known in the art.

Each zone additionally includes an electromagnetic clutch 34. In the illustrative embodiment, a shaft 36 rotates with the drive roller, such as by being fixed to drive roller 22. Shaft 36 passes through clutch roller 30. Shaft 36, or an extension of shaft 36, may be rotatably supported by a bearing 42 in side channel 28. A conventional axle cartridge 38 supports an opposite end of drive roller 22. Axle cartridge 38 may be provided according to the provisions of commonly assigned U.S. Pat. No. 6,782,996, the disclosure of which is hereby incorporated herein by reference. Clutch roller 30 is supported at one end by a bearing 40 that spans shaft 36 and is supported at an opposite end by electromagnetic clutch 34. Clutch 34 selectively interconnects clutch roller 30 with shaft 36 to propel roller 22 from the movement of belt 24. Thus, if it is desired to convey articles through a particular zone, a control (not shown), which monitors photo-eyes 16a, 16b, selectively activates electromagnetic clutch 34 which causes the rotation of clutch roller 30 by drive belt 24 to be transmitted to conveying belt 18 via drive roller 22. When it is desired to accumulate articles in a particular zone, the control deactivates electromagnetic clutch 34, thus allowing clutch roller 30 to rotate without resulting in a rotation in drive roller 22. This causes conveying belt 18 to drift to a stationary state in the particular zone. In the illustrated embodiment, clutch 34 allows drive roller 22 to be freely rotational, at least in a forward direction, when the clutch is de-actuated. This allows articles to drift in a zone rather than abruptly stopping. This more closely mimics the action of a pneumatic accumulator.

In the illustrative embodiment, electromagnetic clutch 34 includes a pair of concentric cylinders. Portions of the cylinders are aligned in a vertical plane. A force transmission member selectively transmits force between the concentric cylinders when the clutch is electrically actuated, such as with an electromagnetic actuator. One of the cylinders is fixed to clutch roller 30 and the other to shaft 36. The electromagnetic actuator may be stationary. This avoids the necessity for expensive and fragile electrical slip rings to feed power to an electromagnetic actuator. It also facilitates maintenance by allowing the clutch to be replaceable as a unit. An example of such a clutch is one having a force transmission member in the form of a tensioning member. An example of such a device is an electromagnetic spring clutch. The spring clutch may be a wrapped-spring clutch of the type marketed by various entities. In the illustrative embodiment, electromagnetic clutch 34 is a Model EC30 clutch marketed by Reell Precision Manufacturing Corporation of St. Paul, Minn.

A representative configuration of a wrapped-spring clutch is disclosed in detail in U.S. Pat. No. 4,263,995, the disclosure of which is hereby incorporated herein by reference. The electromagnetic clutch 34 operates by locking clutch roller 30 to shaft 36. Shaft 36 rotates with drive roller 22. Thus, when electromagnetic clutch 34 is actuated, shaft 36 rotates with clutch roller 30, thereby causing rotation of drive roller 22. Shaft 36 is free to rotate as a result of being supported at one end by bearing 42. Drive roller 22 is rotatably supported on an opposite end by axle cartridge 38 which allows free rotation thereof. When clutch 34 is not actuated, drive roller 22 is freely rotatable with respect to clutch 34. Thus, if used in an incline, a one-way bearing may be used with one of the rollers with each zone. This would prevent articles from coasting upstream under the force of gravity when a zone on an incline is not actuated. Such one-way bearing is known in the art. Also, if used in a decline, an electromagnetic brake may be used with one of the rollers with each zone. This would prevent articles from coasting downstream under the force of gravity when a zone on a decline is not actuated. Such brake is known in the art and is actuated when the clutch is not actuated. An example is described in commonly assigned U.S. Pat. No. 7,021,456 entitled CONVEYOR ROLLER WITH BRAKE, the disclosure of which is hereby incorporated herein by reference.

Figure 6:
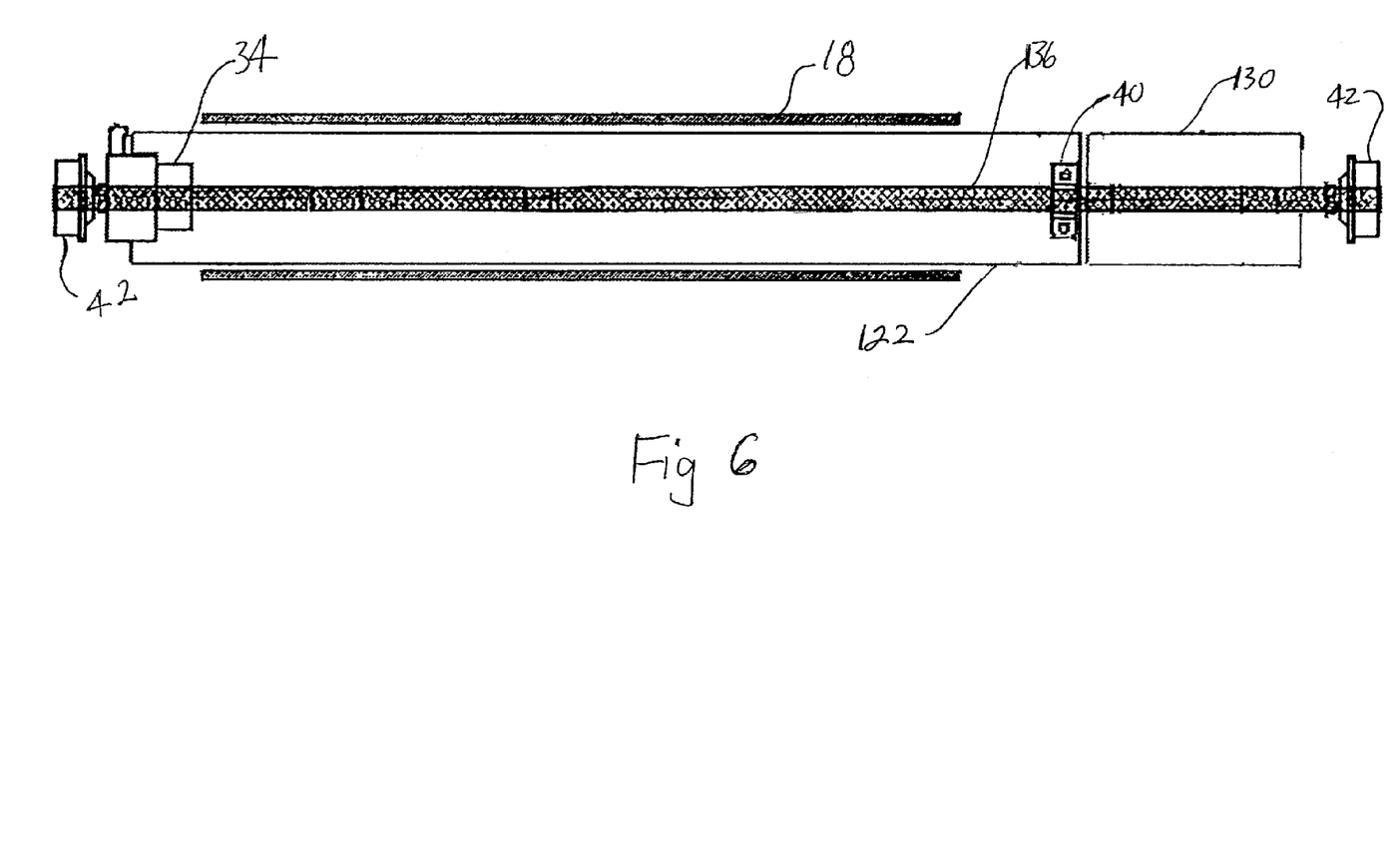
FIG. 6 is the same view as FIG. 4 of an alternative embodiment.

Other embodiments will be apparent to the skilled artisan. Alternative to separate shafts at opposite ends of drive roller 22, a common axle 136 may be provided for both a clutch roller 130 and a drive roller 122 (FIG. 6). Such common axle may be rotatably supported in side channels 28 by a pair of bearings 42 and be fixed to clutch roller 130. This allows clutch 34 to be positioned at an end of drive roller 122 away from clutch roller 30. Alternatively, the shaft may be fixed to the side channels using conventional hex openings with clutch roller 30 and transmission roller 32 rotatably supported on the shaft by suitable bearings and with a mechanism to transmit torque through electromagnetic clutch 34 between clutch roller 30 and transmission roller 32.

Figure 7:
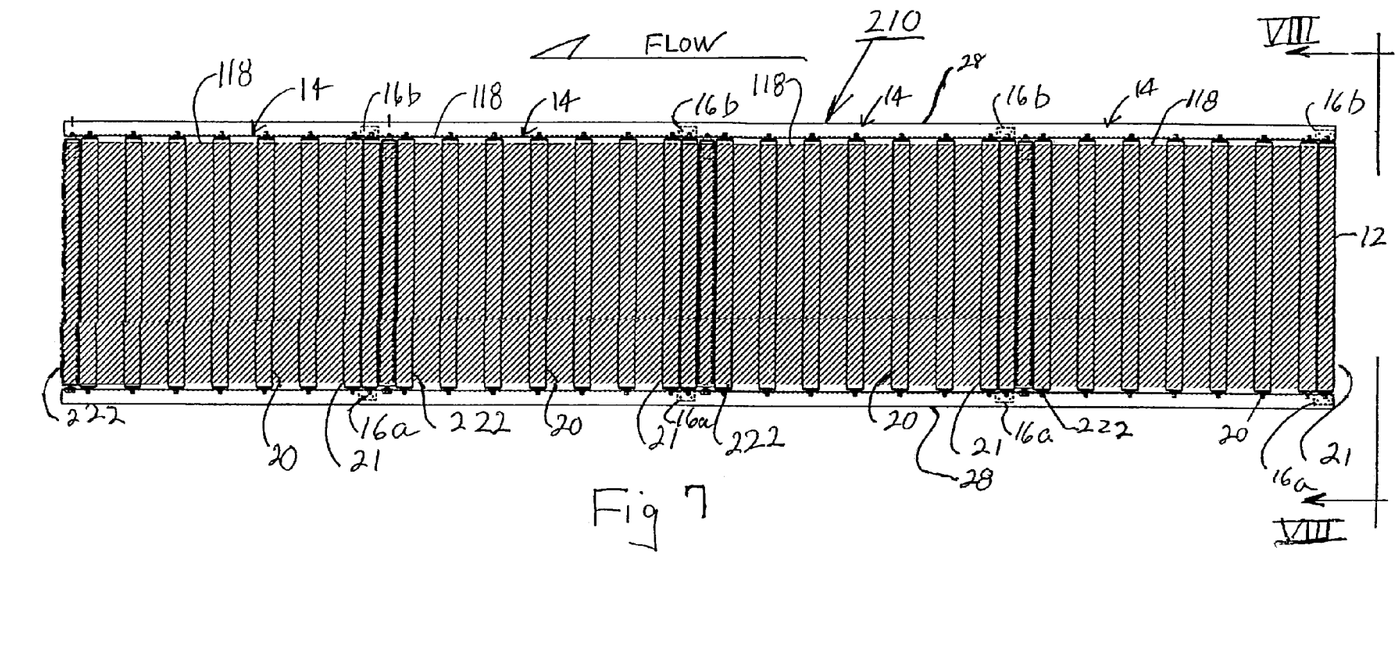
FIG. 7 is a top plan view of an airless accumulation conveyor, according to an alternative embodiment of the invention.
Figure 8:
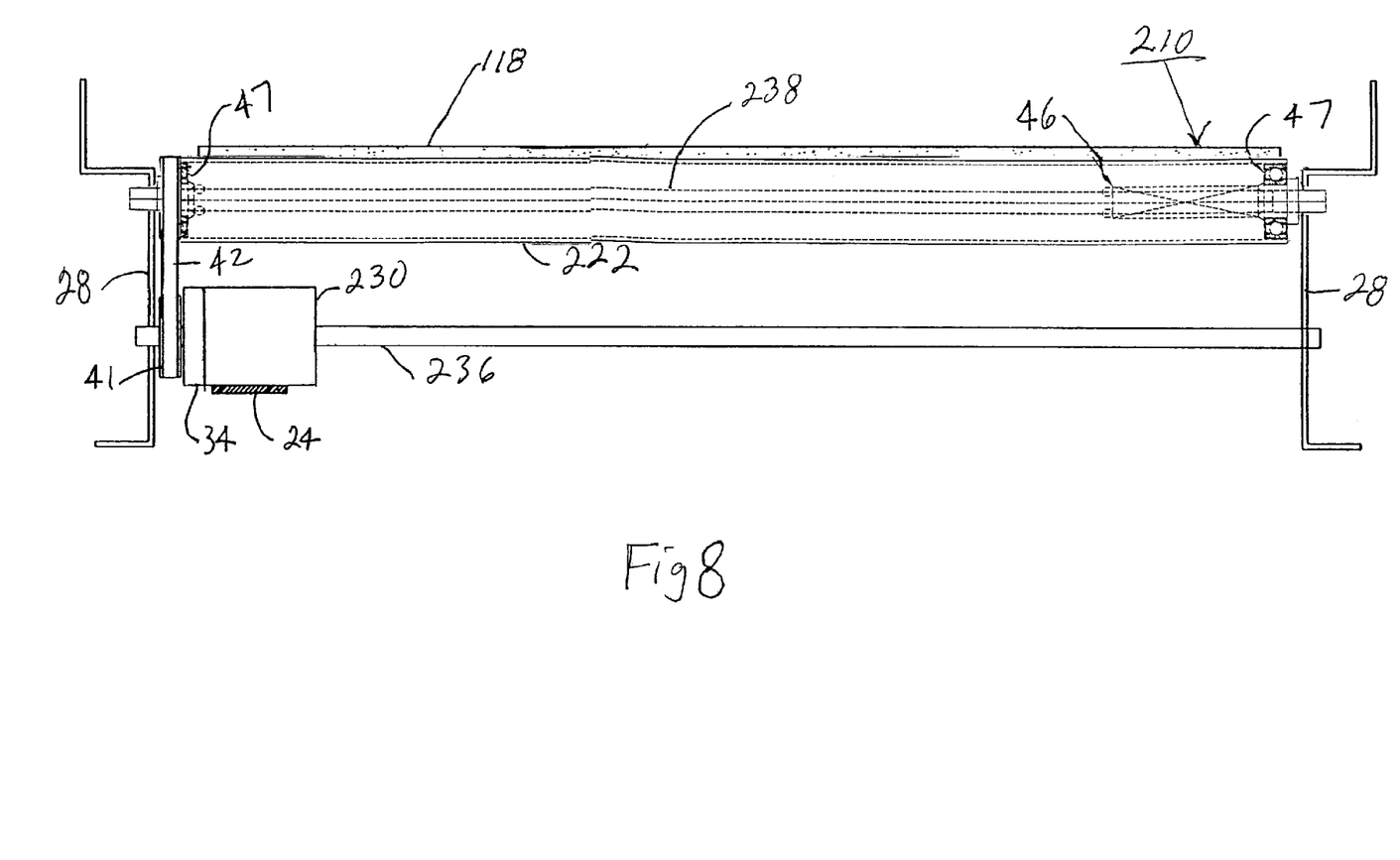
FIG. 8 is an end elevation taken along the lines III-III in FIG. 7.

In an alternative embodiment, an airless accumulation conveyor 210 includes a conveying surface 12 for conveying articles (FIGS. 7 and 8). As is conventional, accumulation conveyor 210 is divided into a plurality of tandem zones 1.4. Each zone includes an article sensors, such as a photo-eye, for sensing articles in the particular zone. In the illustrated embodiment, the photo-eye uses a source/sensor unit 16a and a reflector 16b, but unitary sensors may be used. Also, proximity sensors, sensing rollers, and the like, may be used. Each zone further includes a conveying belt 118 that is selectively movable to convey articles and stopped to accumulate articles.

Conveying belt 118 may extend substantially the entire width of conveying surface 12 as shown in FIG. 7. Support rollers 20 are freely rotatable rollers. Drive roller 222 and/or tensioning roller 21 at the opposite end of that zone may have one or more ridges. This acts to track belt 118. Also, at a junction between zones, the upstream roller may have a slightly larger diameter than the adjacent downstream roller. This eases transfer of an article from one zone to another. It also allows rollers to be field retrofitted on existing pneumatic accumulation conveyors by ensuring uniform shaft spacing. Tensioning roller 21 includes a full shaft 45 that supports the cylinder by opposite bearings 47. A spring 46 allows shaft 45 to be positioned in side channels 28. Support rollers may be made from cartridges 38 rotatably supporting a cylinder at opposite ends.

Conveying belt 118 is selectively driven by one or more drive rollers 222 in that zone. Drive roller 222 may be the lead roller in the zone, as illustrated in FIG. 7, or the trailing roller in the zone, or both. Drive roller 222 is driven by the motion of a clutch roller 30 which is rotated by a drive member, such as drive belt 24. Drive belt 24 is below conveying surface 1.2 and extends the length of accumulation conveyor 10. Drive belt 24 is continuously rotated by an electric drive 25. Such electric drive and drive belt are conventional. Drive belt 24 is brought into contact with clutch roller 30 utilizing one or more snubber rollers 26 or other snubbing technique known in the art. Rollers 20, 21 and 22 are supported by opposite side channels 28 which may be either supported off the floor or may be suspended from above, such as by roof trusses, as is known in the art.

Figure 9:
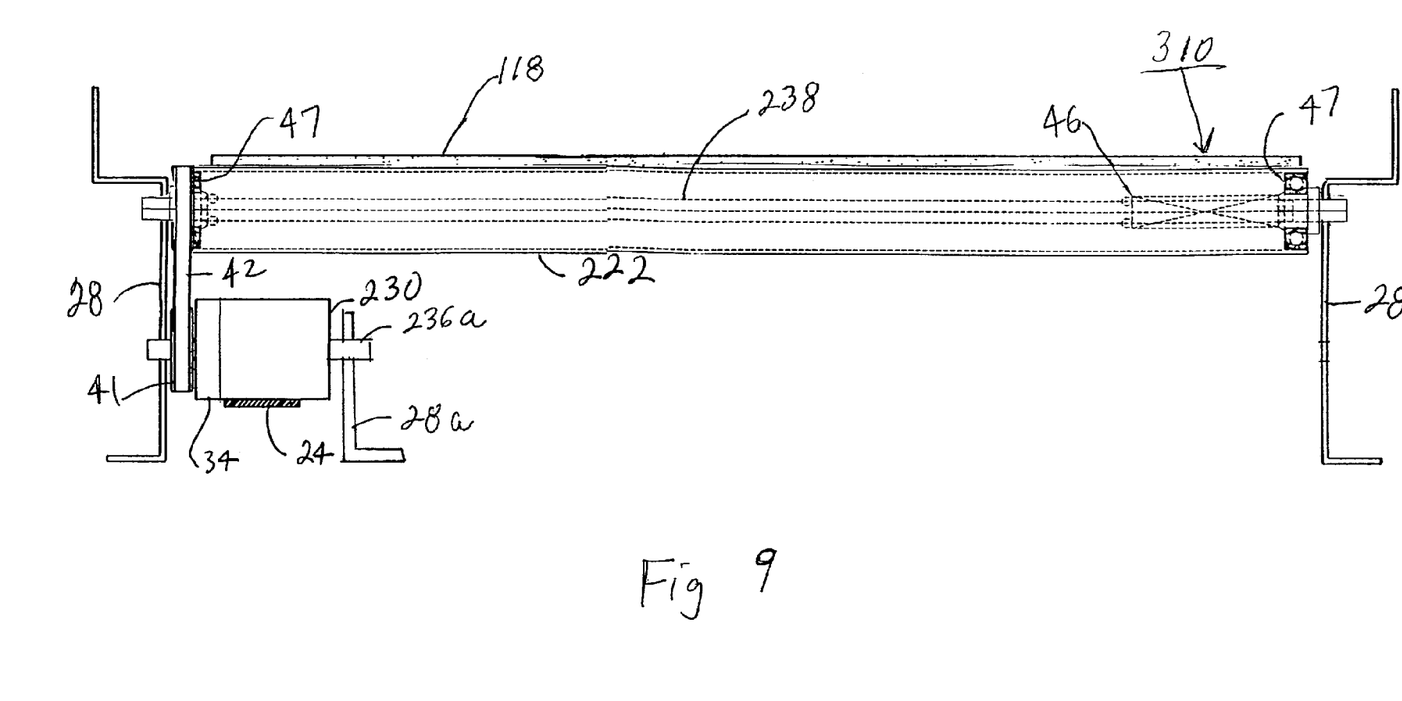
FIG. 9 is the same view as FIG. 8 of another alternative embodiment.

Clutch roller 230 is not collinear with drive roller 222. Clutch roller 230 is supported below drive roller 222 either by side channels 28, as shown in FIG. 8, or one side channel 28 and a bracket 28a, as shown in FIG. 9. Each zone additionally includes an electromagnetic clutch 34. In the illustrative embodiment, a shaft 236, 236a rotates with the drive roller, such as by being interconnected with drive roller 222 through a transmission media, such as cogged-belt 42. Shaft 236, 236a passes through clutch roller 230. Shaft 236, 236a or an extension of the shaft, may be rotatably supported by a bearing (not shown) in side channel 28. Clutch roller 230 is supported at one end by a hearing (not shown) and is supported at an opposite end by electromagnetic clutch 34. Clutch 34 selectively interconnects clutch roller 230 with shaft 236, 236a and, hence, through pulley 41 and cogged-belt 42 to drive roller 222, to propel roller 222 from the movement of belt 24. Thus, if it is desired to convey articles through a particular zone, a control (not shown), which monitors photo-eyes 16a, 16b, selectively activates electromagnetic clutch 34 which causes the rotation of clutch roller 230, rotated by drive belt 24, to be transmitted to conveying belt 118 via drive roller 222. When it is desired to accumulate articles in a particular zone, the control deactivates electromagnetic clutch 34, thus allowing clutch roller 230 to rotate without resulting in a rotation in drive roller 222. In the illustrated embodiment, clutch 34 allows drive roller 222 to be freely rotational, at least in a forward direction, when the clutch is de-actuated. This allows articles to drift in a zone rather than abruptly stopping. This more closely mimics the action of a pneumatic accumulator. Operation of clutch 34, which is illustrated as a wrapped-spring clutch, but may be other types of clutch mechanisms as previously described.

Drive roller 222 may be supported from side channels 28 by a hex-shaft 238 and a pair of bearings 47 which support the roller from the shaft. This provides an exceptionally robust construction and allows belt 18 to extend almost the entire distance between side channels 28. A spring 46 internal to roller 222 allows the shaft 238 to be laterally displaced in order to allow the roller to be inserted therein. This also allows for an easy mechanism for replacement of cogged-belt 42. Moreover, the loading placed on clutch 34 is generally limited to the tension of belt 42 and belt 24. This minimizes the wear on clutch 34.

Figure 10:
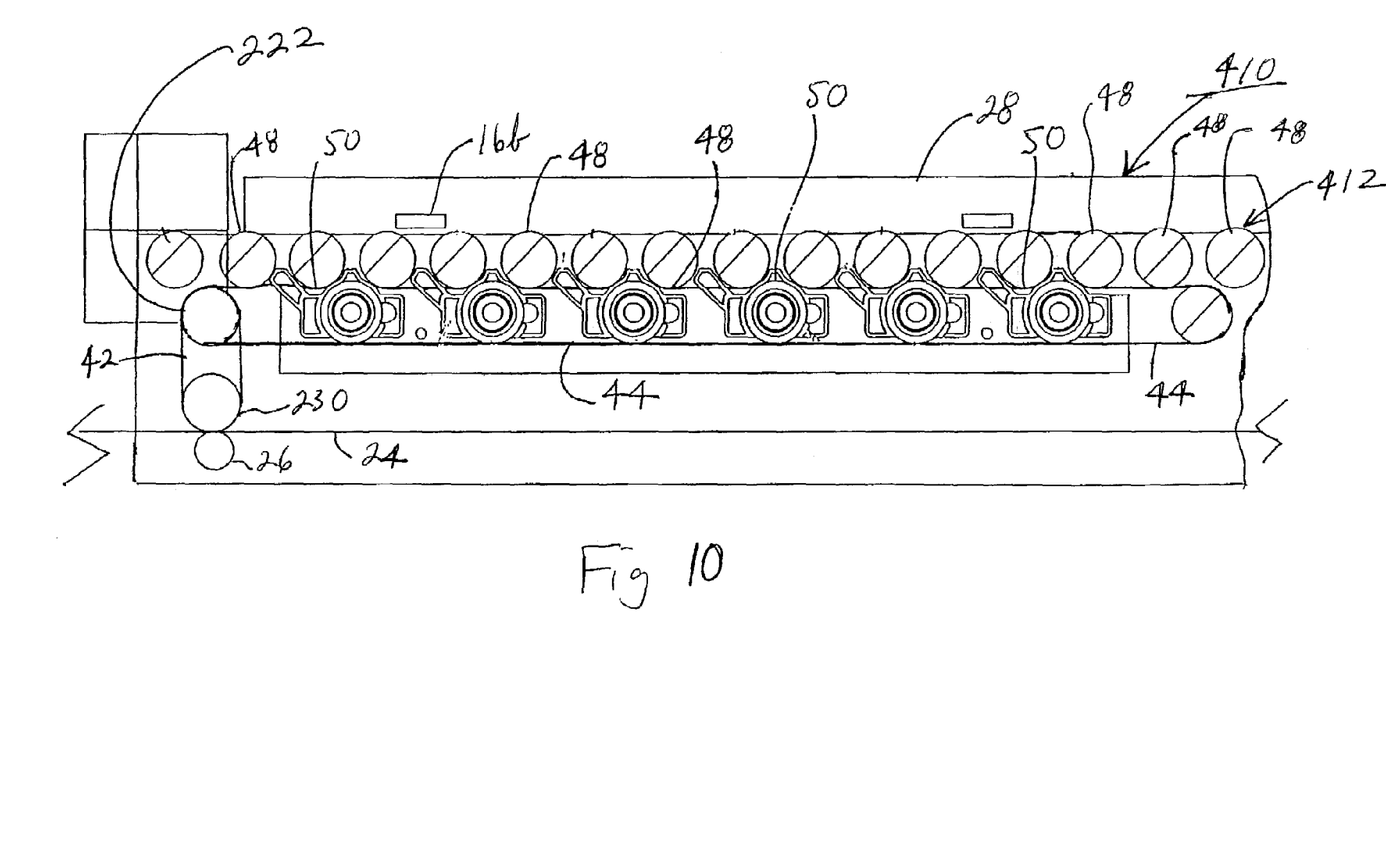
FIG. 10 is a side elevation of one zone of another alternative embodiment of an airless accumulation conveyor.

Another alternative embodiment of an airless accumulation 410 includes a secondary belt 44 rotated by drive roller 222 (FIG. 10). Secondary belt 42 is snubbed against rollers 48 which define a conveying surface 412. Thus, when clutch 34 is actuated, the rotation of drive roller 222 causes belt 44 to travel, which, in turn, causes rotation of rollers 48 in that zone. Belt 44 drives the rollers in one zone. The manner in which secondary belt 44 drives rollers 48 is disclosed in detail in commonly assigned U.S. Pat. No. 6,899,219, the disclosure of which is hereby incorporated herein by reference.

Figure 11:
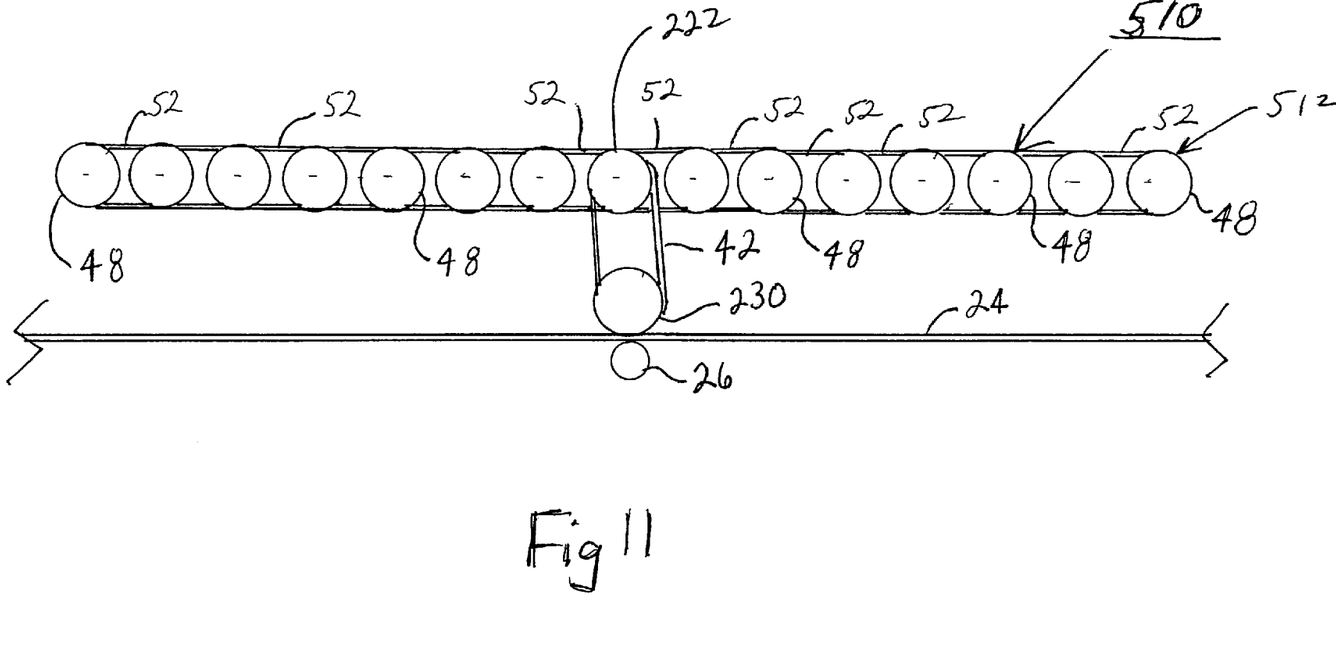
FIG. 11 is a side elevation of one zone of another alternative embodiment of an airless accumulation conveyor.

Yet another alternative embodiment of an airless accumulation conveyor 510 includes a conveying surface 51.2 made up of drive roller 222 and a plurality of rollers 48 on opposite sides of drive roller 222 in a particular zone (FIG. 11). Rollers 48 are interconnected with each other and with drive roller 22 utilizing a series of O-rings 52 which are conventional. Other alternative embodiments will be apparent to the skilled artisan.

Changes and modifications in the specifically described embodiments can be carried out without departing from the principles of the invention which is intended to be limited only by the scope of the appended claims, as interpreted according to the principles of patent law including the doctrine of equivalents.

The embodiments of the invention in which an exclusive property or privilege is claimed are defined as follows:

1. An accumulation conveyor, comprising:
   a plurality of tandem accumulation zones;
   each of said zones including a conveying surface and at least one drive roller selectively driving said conveying surface;
   a drive member below said conveying surface, said drive member extending a length of said plurality of tandem accumulation zones;
   each of the zones including a clutch roller rotated by said drive member; and
   each of the zones including an electromagnetic clutch, said clutch selectively transferring rotation of said clutch roller to said drive roller to drive said conveying surface, said clutch comprising a pair of concentric cylinders having portions aligned in a vertical plane and a force transmission member selectively transmitting force between said concentric cylinders, one of said concentric cylinders rotational with said clutch roller and the other of said concentric cylinders rotational with said drive roller, said force transmission member transmitting force between said concentric cylinders when said clutch is electrically actuated.

2. The accumulation conveyor of claim 1 wherein said concentric cylinders are freely rotational with respect to each other in at least one direction when said clutch is not electrically actuated.

3. The accumulation conveyor as claimed in claim 1 wherein said clutch is adapted to be actuated by a low-voltage signal.

4. The accumulation conveyor as claimed in claim 1 wherein said force transmission member comprises a tensioning member.

5. The accumulation conveyor as claimed in claim 4 wherein said tensioning member comprises a wrapped spring.

6. The accumulation conveyor as claimed in claim 1 including an electromagnetic actuator in said vertical plane, said electromagnetic actuator causing said force transmission member to transmit force between said concentric cylinders when said electromagnetic actuator is actuated.

7. The accumulation conveyor as claimed in claim 6 wherein said electromagnetic actuator is generally stationary.

8. The accumulation conveyor as claimed in claim 1 including a shaft, said drive roller rotational with said shaft wherein said shaft is rotatable with said other of said concentric cylinders.

9. The accumulation conveyor as claimed in claim 8 wherein said shaft is mechanically joined with said drive roller.

10. The accumulation conveyor as claimed in claim 9 wherein said clutch roller and said drive roller are generally collinear with each other.

11. The accumulation conveyor as claimed in claim 1 wherein said conveying surface comprises a conveyor belt.

12. The accumulation conveyor as claimed in claim 11 including at least one ridge on said drive roller, said at least one ridge tracking said conveyor belt.

13. The accumulation conveyor as claimed in claim 12 wherein said at least one ridge comprises a plurality of ridges.

14. The accumulation conveyor as claimed in claim 11 including another roller for each of said zones, said conveyor belt supported by said drive roller and said another roller.

15. The accumulation conveyor as claimed in claim 14 wherein one of said drive roller and said another roller comprises an upstream roller for a particular one of said zones and the other of said drive roller and said another roller comprises a downstream roller for that particular zone and wherein said downstream roller of one of said zones has a larger diameter than said upstream roller of an adjacent downstream zone.

16. An accumulation conveyor, comprising:
   a plurality of tandem accumulation zones;
   each of said zones including a conveying surface and at least one drive roller selectively driving said conveying surface;
   a drive member below said conveying surface, said drive member extending a length of said plurality of tandem accumulation zones;
   each of said zones including a clutch roller rotated by said drive member; and
   each of said zones including an electromagnetic clutch, said clutch selectively transferring rotation of said clutch roller to said drive roller to drive said conveying surface when said clutch is actuated, said clutch comprising a wrapped-spring clutch.

17. The accumulation conveyor as claimed in claim 16 wherein said clutch is adapted to be actuated by a low-voltage signal.

18. The accumulation conveyor as claimed in claim 16 wherein said clutch comprises an electromagnetic actuator and wherein said electromagnetic actuator is generally stationary.

19. The accumulation conveyor as claimed in claim 16 wherein said clutch comprises a pair of concentric cylinders aligned in a vertical plane and a force transmission member between said concentric cylinders, one of said concentric cylinders rotational with said clutch roller.

20. The accumulation conveyor as claimed in claim 19 including a shaft, said drive roller rotational with said shaft wherein said shaft is rotatable with an other of said concentric cylinders.

21. The accumulation conveyor as claimed in claim 20 wherein said shaft is mechanically joined with said drive roller.

22. The accumulation conveyor as claimed in claim 21 wherein said clutch roller and said drive roller are generally collinear with each other.

23. The accumulation conveyor as claimed in claim 16 wherein said conveying surface comprises a conveyor belt.

24. The accumulation conveyor as claimed in claim 23 including at least one ridge on said drive roller, said at least one ridge tracking said conveyor belt.

25. The accumulation conveyor as claimed in claim 24 wherein said at least one ridge comprises a plurality of ridges.

26. The accumulation conveyor as claimed in claim 23 including another roller for each of said zones, said conveyor belt supported by said drive roller and said another roller.

27. The accumulation conveyor as claimed in claim 26 wherein one of said drive roller and said another roller comprises an upstream roller for a particular one of said zones and the other of said drive roller and said another roller comprises a downstream roller for that particular zone and wherein said downstream roller of one of said zones has a larger diameter than said upstream roller of an adjacent downstream zone.

28. An accumulation conveyor, comprising:
a plurality of tandem accumulation zones;
each of said zones including a conveying surface and at least one drive roller selectively driving said conveying surface;
a drive member below said conveying surface, said drive member extending a length of said plurality of tandem accumulation zones;
a clutch roller rotated by said drive member; and
an electromagnetic clutch, said clutch selectively transferring rotation of said clutch roller to said drive roller to drive said conveying surface, wherein said clutch roller and said drive roller are not collinear.

29. The accumulation conveyor as claimed in claim 28 wherein said drive roller is freely rotational in at least one direction when said clutch is not electrically actuated.

30. The accumulation conveyor as claimed in claim 28 wherein said clutch is adapted to be actuated by a low-voltage signal.

31. The accumulation conveyor as claimed in claim 28 wherein said clutch comprises a wrapped-spring clutch.

32. The accumulation conveyor as claimed in claim 28 including a drive member between said clutch and said drive roller.

33. The accumulation conveyor as claimed in claim 32 wherein said drive member comprises a cogged belt.

34. The accumulation conveyor as claimed in claim 28 wherein said conveying surface comprises a conveyor belt.

35. The accumulation conveyor as claimed in claim 34 including at least one ridge on said drive roller, said at least one ridge tracking said conveyor belt.

36. The accumulation conveyor as claimed in claim 35 wherein said at least one ridge comprises a plurality of ridges.

* * * * *